US007617602B2

(12) United States Patent
Dupin et al.

(10) Patent No.: US 7,617,602 B2
(45) Date of Patent: Nov. 17, 2009

(54) METHOD OF SERVICING A TURBINE

(75) Inventors: Philippe Jean-Marie Dupin, Scotia, NY (US); Dennis William Roberts, Schenectady, NY (US); Andrew John Tomko, Glenville, NY (US); John Francis Nolan, Cobleskill, NY (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 11/206,201

(22) Filed: Aug. 18, 2005

(65) Prior Publication Data

US 2007/0041833 A1 Feb. 22, 2007

(51) Int. Cl.
*B23P 6/00* (2006.01)
*B21D 39/00* (2006.01)

(52) U.S. Cl. .................... 29/889.1; 29/402.03; 29/452; 29/525.01; 29/525.11

(58) Field of Classification Search ................ 29/889.1, 29/402.01, 402.03, 402.08, 426.1, 525.01, 29/525.02, 525.11, 452; 81/57.38; 411/136, 411/147, 170, 197, 368, 531
See application file for complete search history.

(56) References Cited

U.S. PATENT DOCUMENTS 970,274 A * 9/1910 Spencer ...................... 411/197
4,567,649 A * 2/1986 Ades et al. .................... 29/800
5,252,029 A * 10/1993 Barnes ....................... 416/142
5,542,984 A * 8/1996 Krajicek .................... 134/22.1
6,224,332 B1 * 5/2001 Leach et al. ................ 415/126
6,685,406 B2 * 2/2004 Whitney et al. ............ 411/14.5

FOREIGN PATENT DOCUMENTS

FR 2237102 A * 3/1975
JP 59196911 A * 11/1984

* cited by examiner

*Primary Examiner*—Jermie E Cozart
(74) *Attorney, Agent, or Firm*—Nixon & Vanderhye, P.C.

(57) ABSTRACT

The temporary fastening system for joining upper and lower shell casings of a turbine to one another for maintenance purposes includes a stud/nut tensioning system employed in lieu of the conventional studs and nuts. Once the turbine is opened up and the inner shell and rotor removed, the upper and lower shell casings are temporarily secured to one another using studs received in registering openings in the horizontal flanges of the upper and lower shell casings and retainer plates serving as a stop for the stud/nut tensioning system. The tensioning system is hydraulically operated and avoids torsional force on the temporary studs. Once measurements are made, the turbine is again reopened and reassembled using the initially removed bolts or a third set of bolts to secure the upper and lower shell casings to one another.

7 Claims, 4 Drawing Sheets

METHOD OF SERVICING A TURBINE

The present invention relates to a joint bolting system for temporarily closing the joint between upper and lower outer turbine shell casings to facilitate servicing of the turbine and particularly relates to a temporary bolting system enabling the flanges of the upper and lower outer shells to be fast bolted to one another whereby bore radial and axial fits and/or measurement of top-on alignment of the turbine shells can be accomplished.

BACKGROUND OF THE INVENTION

The upper and lower outer shell casings of turbines are conventionally bolted to one another along the flanges at a horizontal midline. The bolts or studs used to close the joint between the upper and lower outer shell casings conventionally range in diameter from 2.5 to 6.0 inches with lengths ranging from 18 inches to about 6 feet. The threads on the bolts are on the order of about 8 threads per inch for all of the bolt sizes. In turbines manufactured by the assignee of the present application, the joint between the upper and lower outer shell casings is direct metal to metal contact. Prior to forming the joint, the metal surfaces are scraped and stoned to provide clean surfaces. To prevent the grain boundary from growing at this joint between the upper outer shell half and the lower outer shell half, triple boiled linseed oil is applied to the contacting metal surfaces. While the linseed oil serves as a type of sealant, more importantly, it precludes the grain boundary from growing together. It will also be appreciated that the joint does not have any gaskets or other types of seals and is typically closed with a force of about 35,000 pounds per square inch. To permanently secure the upper and lower casings to one another, the bolts are started from the middle of the turbine shells and worked axially outwardly to close the joint. Once the joint is closed, each bolt is, in sequence, loosened, retightened so that it is snug and then tightened further to stretch or tension the bolt for about 30 to 40 mils to provide a preload on the bolt. The turbine is thus normally operated with the bolts under such preloaded tension.

To service the turbine, the upper and lower outer shell casings are unbolted along the horizontal midline and the upper shell casing is removed. The rotor is then removed from the lower shell casing. However, certain measurements must be taken with the outer shell casings bolted to one another after the rotor has been removed. Thus, the upper and lower shell casings are re-bolted to one another to effect those measurements. It will be appreciated that a typical re-bolting or temporary bolting of the upper outer shell casing to the lower outer shell casing can be an arduous and lengthy task. For example, when re-bolting with the bolts previously removed from the turbine, it is difficult for mechanics to lift and thread the very heavy nuts onto the bolts. A six inch nut will weigh about 82 pounds, and it is difficult to start the threads onto the bolts particularly where the nut is started in very low and confined spaces. Normally, two or more eight hour shifts are necessary for the mechanics to temporarily close the joint. Further, when the initially removed bolts are reused to temporarily close the joint to effect the measurements, the bolts must be first cleaned. With that requirement, the turbine must be maintained in an out-of-service condition for the additional time period required to clean the used set of bolts. Accordingly, there is a need for a fast temporary bolting system for closing the joint between upper and lower outer shell turbine casings to facilitate the measurements necessary for servicing the turbine with the rotor removed from the turbine.

BRIEF DESCRIPTION OF THE INVENTION

In a preferred embodiment of the present invention there is provided a method of fast bolting upper and lower outer shells of a turbine to one another along a horizontal joint therebetween comprising the steps of: (a) inserting a stud through registering openings in flanges of the upper and lower shells; (b) providing a retainer plate having a lateral opening; (c) applying the retainer plate laterally to and about the stud with the lateral opening receiving the stud; (d) locating the retainer plate along the stud adjacent one end thereof and on a side of one of the flanges remote from another of the flanges; (e) tensioning the stud adjacent an opposite end of the stud; and (f) applying a force from tensioning the stud to said another flange in a side thereof remote from said one flange to close the joint.

In a further preferred embodiment of the present invention there is provided a method of servicing a turbine comprising the steps of: (a) removing a first set of bolts from flanges forming a joint between upper and lower outer shells of the turbine to open the joint; (b) removing the upper shell from the lower shell; (c) removing the rotor from the lower shell; (d) after step (c), closing the joint by temporarily bolting the flanges of the upper and lower outer shells to one another using a second set of bolts and including (i) inserting a stud of said second set of bolts through registering openings in flanges of said upper and lower shells, (ii) providing a retainer plate having a lateral opening, (iii) applying the retainer plate laterally to and about the stud with the lateral opening receiving the stud, (iv)locating the retainer plate at an axial location along the stud adjacent one end thereof and on a side of one of the flanges remote from another of the flanges, (v) tensioning the stud adjacent an opposite end of the stud and (vi) applying a reaction force from tensioning the stud to said another flange in a side thereof remote from said one flange to close the joint; (e) removing the second set of bolts from the flanges to again open the joint; (f) after step (e), removing the upper shell from the lower shell; (g) installing a rotor into the lower shell of the turbine; and (h) closing the joint by bolting the flanges of the upper and lower shell to one another using said first set of bolts or a third set of bolts.

DETAILED DESCRIPTION OF THE PRESENT INVENTION

Figure 1:
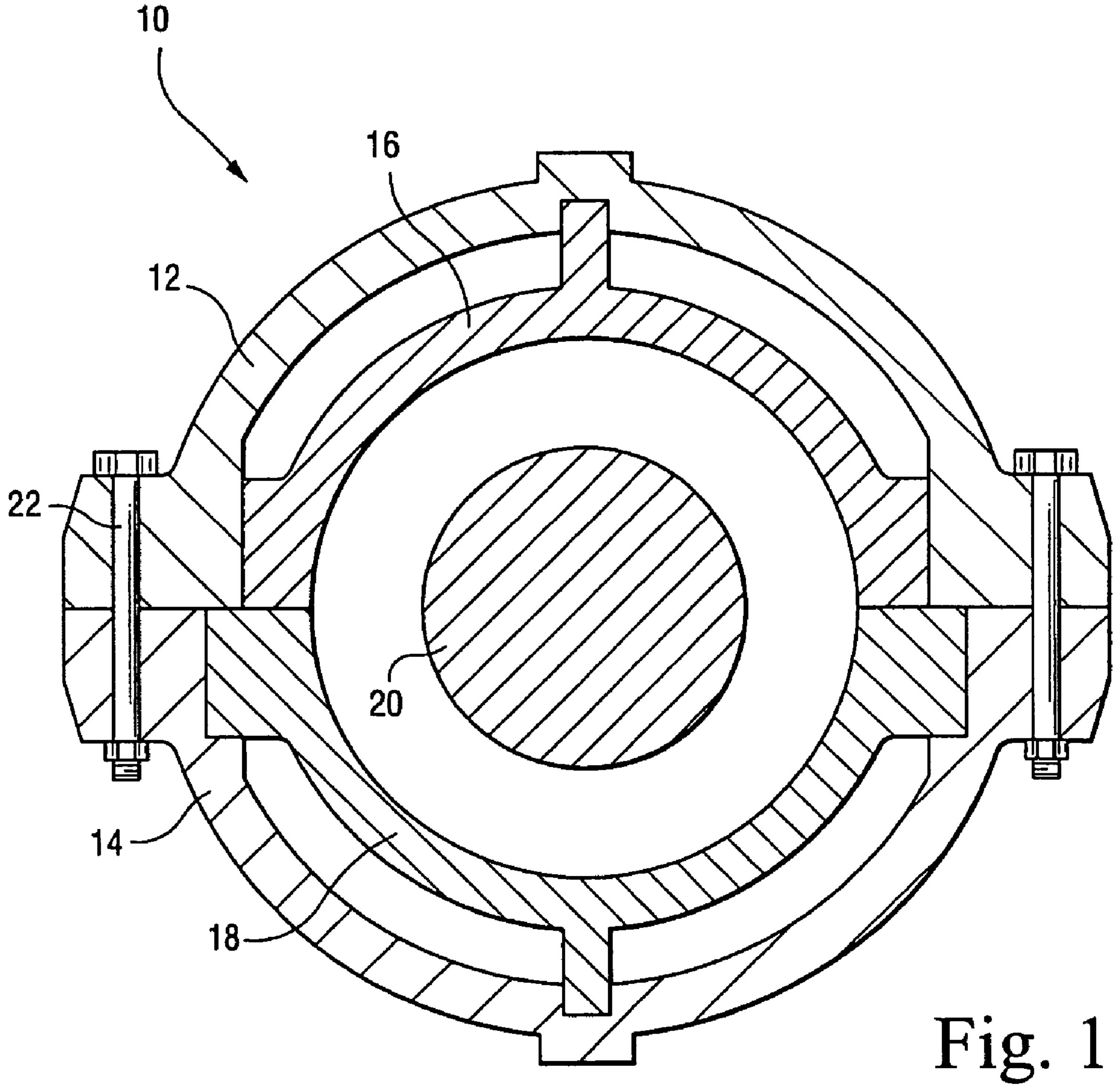
FIG. 1 is a schematic illustration of a cross-section through a turbine illustrating upper and lower shell casings bolted to one another.
Figure 2:
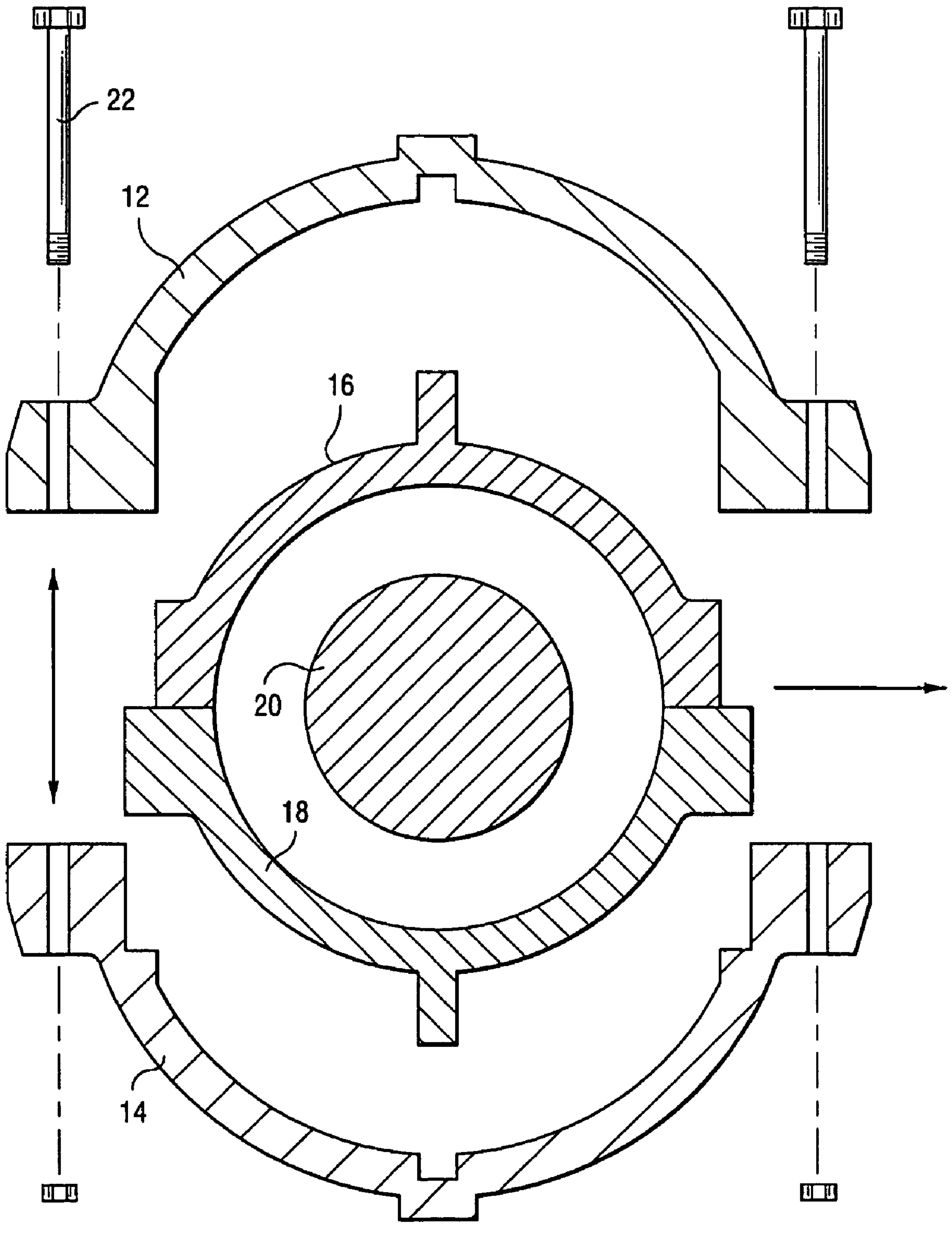
FIG. 2 is a schematic view similar to FIG. 1 with parts broken away from one another to illustrate the sequence of removing the upper outer shell and inner casing and rotor from the turbine.
Figure 3:
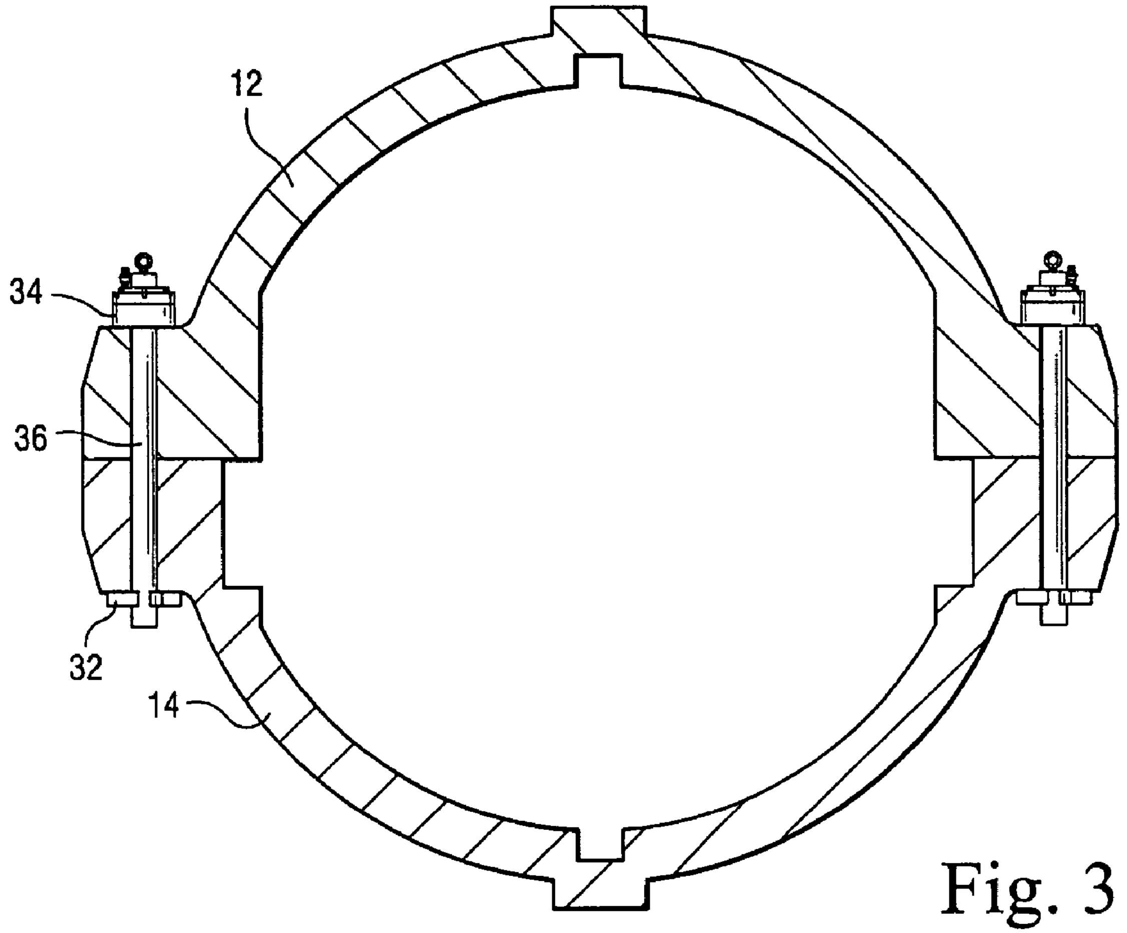
FIG. 3 is a cross-sectional view similar to FIG. 1 illustrating the temporary securement of the upper and lower outer shell casings with the rotor removed.

Referring to the drawings, particularly to FIG. 1, there is schematically illustrated a cross-sectional view of a turbine generally designated 10 comprised of upper and lower outer shell casings 12 and 14 respectively, upper and lower inner shell casings 16 and 18 respectively and a rotor 20. It will be appreciated that in order to service the turbine the upper outer shell casing 12 must first be unbolted from the lower outer shell casing 14 to expose the inner shell casings and the rotor 20. To accomplish that, the bolts 22 which normally secure the upper and lower shell casings 12 and 14 to one another along the horizontal midline of the turbine must first be removed. Once bolts 22 are removed, the upper outer shell 12 is removed together with the inner shell 16 and rotor 20 as schematically illustrated in FIG. 2.

Figure 4:
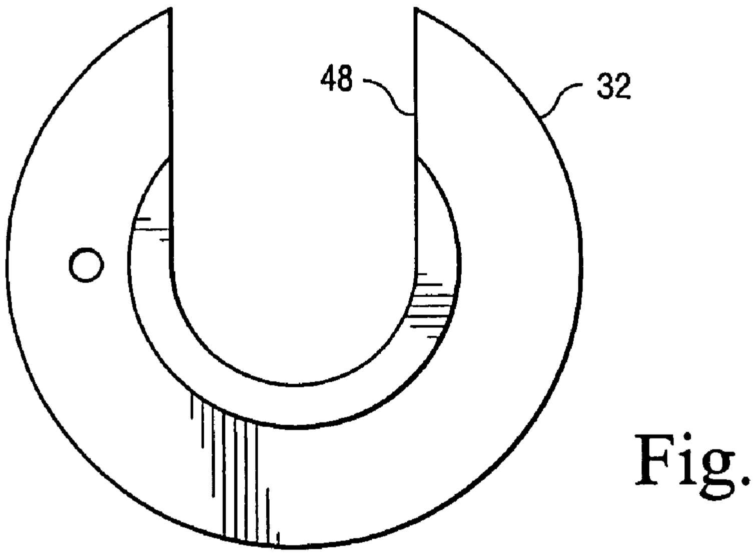
FIG. 4 is an enlarged plan view of a retainer for use with the temporary bolting system hereof.

With the rotor 20 and ancillary parts removed from the lower outer shell 14, the turbine is temporarily closed by bolting the upper and lower outer shells 12 and 14 to one another in order to effect various measurements necessary to the servicing of the turbine. As indicated previously, it is desirable to use a fast bolting system to temporarily close the joint between the upper and lower outer shell casings. To accomplish that, a fluid actuated bolt tensioning system together with the use of a reaction plate that eliminates threads and a nut on the lower part of the bolt or stud are utilized. Particularly, and referring to FIGS. 5 and 6, a fluid actuated bolt tensioning system generally designated 30 is utilized in conjunction with a retainer plate 32. The bolt tensioning system 30 includes a fluid actuated cylinder 34 slidable on a temporary stud 36, a retainer nut 38 and a piston 40 connected to stud 36. The retainer nut is threadable on the piston 40. A chamber 42 is provided for receiving a fluid, preferably a hydraulic fluid from a fluid source, not shown, via a quick connect disconnect coupling 44. At the opposite end of the stud 36, a retainer plate 32 is disposed in a groove 46 formed adjacent the end of the stud. That is, the retainer plate 32 has a slot 48 (FIG. 4) opening laterally of the plate such that the plate can be laterally received within the groove 46. It will be appreciated that the retainer plate 32 serves as a stop which bears against one of the flanges of the upper or lower outer shell casings, preferably the underside of the lower casing flange.

When it is desired to temporarily close the turbine and temporarily bolt the upper and lower shell casings to one another, the studs 36 may be inserted through the aligned or registering openings in the flanges of the upper and lower shell casings. Once received within the openings, for example with the cylinder head 34 butting the upper surface of the upper flange, the lower end of the stud is exposed through the lower side of the lower flanges. The retainer plate 32 is then applied laterally for reception in the groove 46. The retainer plate 32 thus serves as a stop against the underside of the lower flange of the lower shell casing. By introducing the fluid, preferably hydraulic fluid into the chamber 42, the piston 40 is displaced away from the flanges of the shell casings drawing the retainer plate 32 against the underside of the flange of the lower shell casing. Upon application of further fluid pressure, the cylinder engages the surface of the flange of the upper shell casing thus tensioning the stud 36. The retainer nut 38 can then be rotated or screw threaded about the piston 40 to secure the cylinder and piston to one another in the stud tensioned position. It will be appreciated that a torsional force is not utilized in this bolt tensioning system. Thus the possibility of marking and scoring the mating machined fits on the shell casings is reduced or eliminated. It also eliminates any thread damage that can occur on the operating studs and nuts.

Figure 5:
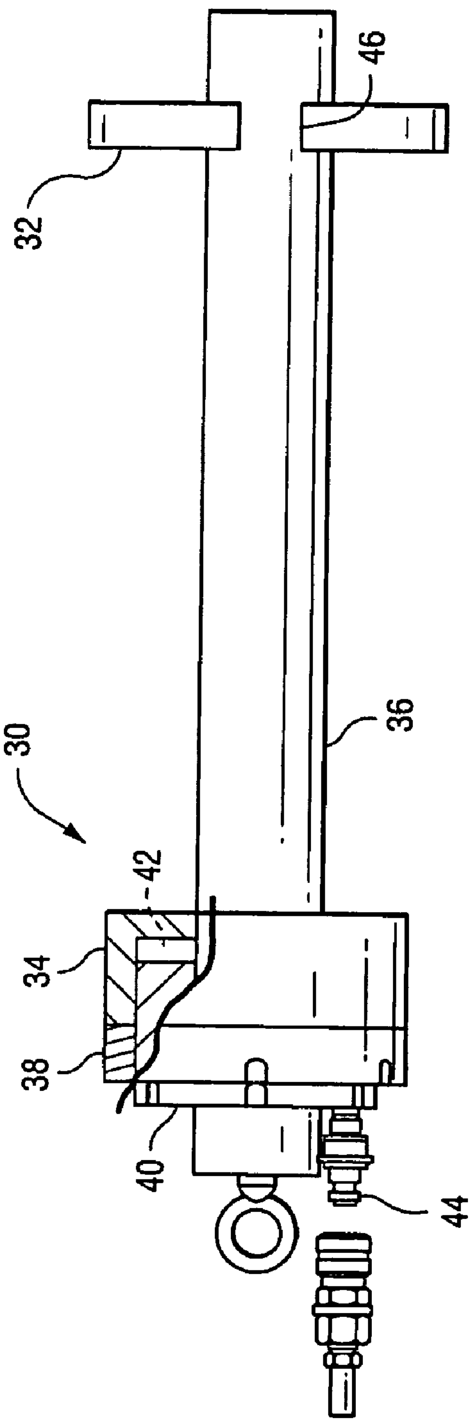
FIGS. 5 and 6 are side elevational views illustrating respective stud and nut tensioning system for temporarily securing the upper and lower outer shell casings to one another during servicing.
Figure 6:
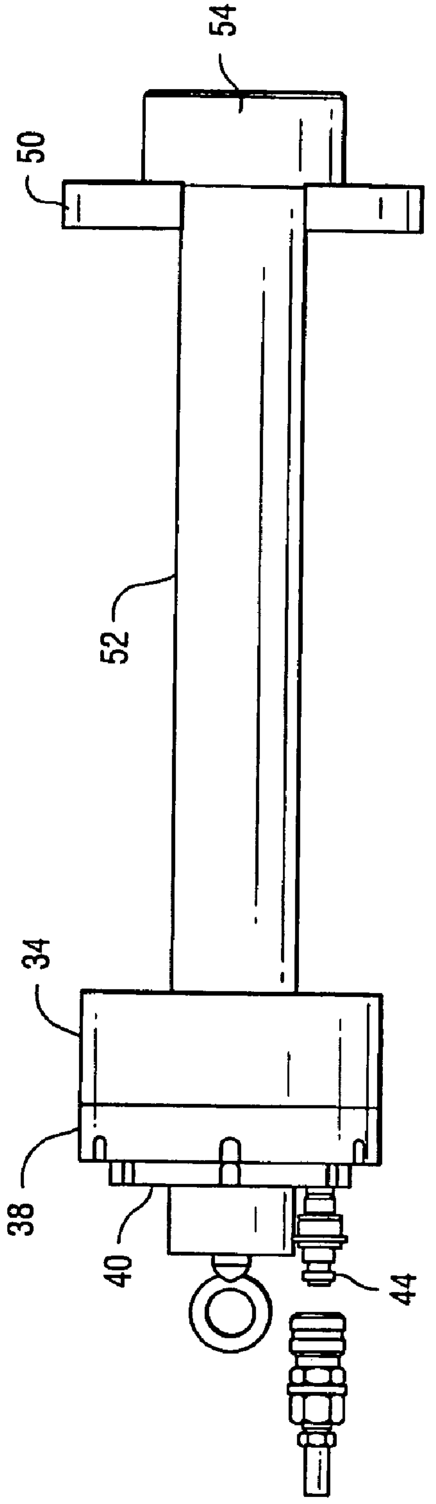

Referring to FIG. 6, the bolt tensioning system is similar to that disclosed in FIG. 5 except that, instead of a groove 46 formed on the end of the stud, a small retaining nut may be screw threaded on the end of the stud. A retainer plate in the form of a washer 50 is first applied to the stud 52 as it projects from the underside of the flange of the lower shell casing. A small nut 54 can then be threaded onto the end of the stud whereby the washer serves as a stop similarly as a retainer plate 32. Alternatively, the retainer plate 32 of FIG. 5 may be used in lieu of washer 50 and in conjunction with the small nut 54.

As noted previously, bolt tensioning systems are conventional per se. For example in lieu of the disclosed fast bolt tensioning system, a tensioning system such as described and illustrated in U.S. Pat. No. 6,685,406 may be utilized. The disclosure of that patent is incorporated herein by reference.

Once the measurements have been taken, the turbine is once again opened up. The fast bolt tensioning system securing the upper and lower shell casings to one another about the horizontal midline are removed and the turbine once again opened up. The rotor and ancillary parts are installed into the turbine. The upper shell casing is then finally secured to the lower shell casing using the refurbished first set of bolts previously removed from the turbine when initially opening the turbine or a third set of fresh bolts may be utilized to secure the upper and lower shell casings to one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of temporarily fast bolting upper and lower outer shells of a turbine to one another along a horizontal joint therebetween during turbine servicing comprising the steps of:

(a) inserting a stud through registering openings in flanges of the upper and lower shells of the turbine;

(b) providing a retainer plate having a slot opening laterally of the plate;

(c) applying the retainer plate laterally to the stud in a direction perpendicular to the stud, with the slot receiving the stud;

(d) locating the retainer plate along the stud adjacent one end thereof and on a side of one of the flanges remote from another of the flanges;

(e) utilizing a fluid actuator, tensioning the stud adjacent an opposite end of the stud and thereby applying a force to said another flange to close the joint.

2. A method according to claim 1 wherein step (d) includes providing a nut adjacent said one end of the stud for retaining the plate on the stud on a side of the retainer plate removed from said one flange.

3. A method according to claim 1 wherein step (d) includes forming a groove along said stud adjacent said one end thereof and step (b) includes providing the slot with a width less than the diameter of said stud enabling portions of the retainer plate on opposite sides of and defining the slot to engage in the groove.

4. A method of servicing a turbine comprising the steps of:

(a) removing a first set of bolts from flanges forming a joint between upper and lower outer shells of the turbine to open the joint;

(b) removing the upper shell from the lower shell;

(c) removing the rotor from the lower shell;

(d) after step (c), closing the joint by temporarily bolting the flanges of the upper and lower outer shells to one another using a second set of bolts and including (i) inserting a stud of said second set of bolts through registering openings in flanges of said upper and lower shells, (ii) providing a retainer plate having a lateral open slot, (iii) applying the retainer plate laterally to and about the stud, the laterally open slot permitting the retainer plate to be received within a groove formed in the stud, (iv) locating the retainer plate at an axial location along the stud adjacent one end thereof and on a side of one of the flanges remote from another of the flanges, (v) tensioning the stud adjacent an opposite end of the stud and (vi) applying a reaction force from tensioning the stud to said another flange in a side thereof remote from said one flange to close the joint;

(e) removing the second set of bolts from the flanges to again open the joint;

(f) after step (e), removing the upper shell from the lower shell;

(g) installing a rotor into the lower shell of the turbine; and (h) closing the joint by bolting the flanges of the upper and lower shells to one another using said first set of bolts or a third set of bolts.

5. A method according to claim 4 wherein steps (e) and (f) include providing a fluid-actuated nut on said opposite end of the stud.

6. A method according to claim 4 wherein step (d) includes providing a stop adjacent said one end of the stud on a side of the retainer plate remote from said one flange.

7. A method according to claim 4 wherein step (d) includes forming said groove along said stud adjacent said one end thereof and step (b) includes providing the laterally open slot with a width less than the diameter of said stud enabling portions of the retainer plate on opposite sides of the laterally open slot to engage in the groove.

* * * * *